(12) United States Patent
Linska et al.

(10) Patent No.: US 11,873,571 B2
(45) Date of Patent: Jan. 16, 2024

(54) METHOD FOR COATING A COMPONENT

(71) Applicant: MTU Aero Engines AG, Munich (DE)

(72) Inventors: Josef Linska, Grafing (DE); Richard Auracher, Vierkirchen (DE); Alexander Gast, Dachau (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 17/824,088

(22) Filed: May 25, 2022

(65) Prior Publication Data

US 2022/0380926 A1 Dec. 1, 2022

(30) Foreign Application Priority Data

May 27, 2021 (DE) .................... 10 2021 113 698.9
Dec. 8, 2021 (DE) .................... 10 2021 132 256.1

(51) Int. Cl.
*B23P 15/02* (2006.01)
*C25D 9/08* (2006.01)
*C25D 15/02* (2006.01)

(52) U.S. Cl.
CPC ............... *C25D 9/08* (2013.01); *B23P 15/02* (2013.01); *C25D 15/02* (2013.01); *F05D 2230/10* (2013.01); *F05D 2230/31* (2013.01); *Y10T 29/49336* (2015.01)

(58) Field of Classification Search
CPC .... B23P 15/02; B23P 15/04; Y10T 29/49986; Y10T 29/49982; Y10T 29/4932; Y10T 29/49336
See application file for complete search history.

(56) References Cited

U.S. PATENT DOCUMENTS

| 5,476,363 | A | * | 12/1995 | Freling ..................... F01D 5/20 29/889.7 |
| 5,993,976 | A | * | 11/1999 | Sahoo ....................... C23C 4/02 427/446 |
| 9,932,839 | B2 | | 4/2018 | Guo et al. |
| 10,113,435 | B2 | * | 10/2018 | Pater ......................... F01D 5/18 |
| 10,400,786 | B2 | * | 9/2019 | Wusatowska-Sarnek ................... F01D 11/122 |
| 11,034,842 | B2 | * | 6/2021 | Hafner .................. C04B 41/009 |

(Continued)

FOREIGN PATENT DOCUMENTS

DE 10 2015 208 781 A1 11/2016
DE 10 2017 204 243 A1 9/2018

(Continued)

OTHER PUBLICATIONS

Aul, Komal, Rahemanji, Suebali, "Enhanced CBN Blade Tip System for Improving Engine Efficiency", Advanced Materials & Processes, May 2012, https://www.chromalloy.com/files/newpressrelease/403aaf87-3735-4075-8462-Oaf4a453f2f4.pdf.

(Continued)

*Primary Examiner* — Sarang Afzali
(74) *Attorney, Agent, or Firm* — Hinckley, Allen & Snyder, LLP; David R. Josephs

(57) ABSTRACT

The present invention is directed to a method for coating a component, wherein the component has a first and a second surface, and wherein the first and the second surface adjoin each other at an edge, in which method i) first of all, the edge between the first and the second surface is rounded, and ii) subsequently, a coating is applied to the first surface.

9 Claims, 4 Drawing Sheets

(56) References Cited

U.S. PATENT DOCUMENTS

| | | | |
|---|---|---|---|
| 2008/0026160 A1* | 1/2008 | Taylor | C23C 4/18 |
| | | | 427/454 |
| 2013/0149163 A1 | 6/2013 | Parkos, Jr. et al. | |
| 2015/0031272 A1 | 1/2015 | Fulton et al. | |
| 2018/0087387 A1 | 3/2018 | Shi et al. | |
| 2021/0348562 A1* | 11/2021 | Strock | F01D 11/125 |

FOREIGN PATENT DOCUMENTS

| | | |
|---|---|---|
| DE | 102014218167 B4 | 9/2018 |
| EP | 3336221 A1 | 6/2018 |
| GB | 2310897 A | 9/1997 |

OTHER PUBLICATIONS

Institute of Thermal Turbomachinery and Machine Dynamics, Graz Universityof Technology, "7.1.4 Remedies for Blade Tip Rubbing Damage," Aeroengine Safety, Jun. 25, 2020, https://aeroenginesafety.tugraz.at/doku.php?id=7:71:714:714.

* cited by examiner

METHOD FOR COATING A COMPONENT

BACKGROUND OF THE INVENTION

The present invention relates to a method for coating a component.

The component to be coated can be provided, in particular, for a turbomachine, such as, for instance, a turbojet or turbofan engine. In functional terms, this type of turbomachine is divided into a compressor, a combustion chamber, and a turbine. In the case of an engine, for example, inflow air is compressed by the compressor and undergoes combustion with admixed kerosene in the downstream combustion chamber. The hot gas that is formed, which is composed of a mixture of combustion gas and air, flows through the downstream turbine and thereby undergoes expansion.

For example, in general, in the case of the coating in question here, what can be involved is a protective coating, such as, for instance, for thermal and/or mechanical protection of a surface arranged in the compressor or hot-gas channel. However, the coating can also be applied to a blade tip in particular and, as an especially hard layer, can serve in a run-in lining for running-in. This is intended to illustrate a preferred field of application, but not to limit the subject initially in terms of its generality.

SUMMARY OF THE INVENTION

The present invention is based on the technical problem of presenting an advantageous method for coating a surface of a component.

This problem is solved in accordance with the invention by the method according to claim 1. In this case, the coating is applied to a first surface of the component, wherein, beforehand, an edge by which the first surface adjoins a second surface is rounded. During coating, the prior rounding can prevent any excess accumulation of material at the edge, which could ensue, for example, in a galvanic deposition process from a concentration of field lines at the unrounded, sharp edge. The inventors have observed that a lateral overhang of the coating, which would result from such an excess application of material, can later be detrimental in regard to the strength of the component, in particular under dynamic load (for example, vibrational fatigue strength). In the overhang, it is possible under a vibrational excitation, for example, for the mechanical strain to be relatively higher owing to the geometry and, in particular, for the strain/amplitude ratio to be large. It is then possible, for example, for an initial site for the emergence of a crack to lie there, which ultimately can propagate into the component and can lead to the failure thereof.

In terms of the example in the introduction, the first surface can be the blade tip surface and the second surface can be a side surface of the blade body, that is, the suction side surface and/or pressure side surface. The vibrational excitation can then, in particular, take place through the adjacent blade cascade, as a result of which the blade body is caused to vibrate, whereby the vibrational pattern can include elements in all spatial directions. The component produced in accordance with the method can find application advantageously when modes with high vibrational strains arise in the region of the coating. The vibrational fatigue strength can be detected, for example, by a high-cycle fatigue test, in which the blade is caused to vibrate by root point excitation in the resonance frequency range and is thereby fatigued. Regardless of the investigation details, it is possible by way of the rounding to at least reduce the overhang and this can be of advantage in terms of structural mechanics, particularly in the case of a relatively hard coating. Such a coating can, namely, be especially prone to cracks on account of its higher rigidity.

Preferred embodiments are found in the dependent claims and in the entire disclosure, whereby the description of the features does not always distinguish in individual instances between the device and method aspects; in any case, the disclosure is to be read implicitly in terms of all claim categories. If, for example, a component that has been processed/coated in a certain way is described, this is to be understood at the same time as being a disclosure of a corresponding method, and vice versa.

In general, "a" and "an" are to be read in the scope of the present disclosure, unless explicitly stated otherwise, as the indefinite article and accordingly always implicitly also as "at least one." The first surface can adjoin a further surface of the component in a further edge, for example; in the case of the blade body, for example, the blade tip surface can adjoin the suction side surface and also the pressure side surface at a respective edge. Preferably, all edges in which the first surface adjoins another respective surface are rounded prior to the coating. The second surface or surfaces remains/remain preferably uncoated; that is, the coating is only applied to the first surface.

In accordance with a preferred embodiment, a rounding introduced in step i) has, as viewed in section, a radius of curvature R that corresponds to at least 0.5 times a thickness d of the coating. Further and especially preferably, the radius of curvature can correspond to at least 0.7 or 0.8 times the layer thickness. Advantageous upper limits, which, in general, may be of interest independently of the lower limits and are to be disclosed, lie, increasingly preferably in order of mention, at 5, 4, 3, or 2.5 times the thickness d. By way of a corresponding radius R, it is possible, for example, to limit a lateral overhang of the coating with respect to the second surface or even to completely prevent it.

The section or sectional plane here lies perpendicular to the edge or edge line, which determines the edge in accordance with the edge that is present prior to step i) and is removed with the rounding. The rounding here need not necessarily have a single radius, but can also be composed of a plurality of segments. Preferably, in any case, one of the segments then has a corresponding radius; especially preferably, the radius lies in a corresponding range for all segments.

In a preferred embodiment, the first surface is processed prior to the rounding by material removal, preferably by grinding. The material-removing processing, by way of which, for example, the first surface can be prepared for the coating as such, in this case produces the (sharp) edge, which is then removed again in step i) in a targeted manner.

In accordance with a preferred embodiment, the rounding of the edge comprises a processing with a brush, in particular with an industrial brush. A combined process is preferred, namely, if the rounding introduced using the brush is subsequently additionally processed by grinding. The rounding can accordingly be smoothed, for example, in a vibratory grinding process. By way of the combined steps, it is possible to produce a very gentle, smoothly extending contour. As viewed in section, the rounding extends in each case tangentially in the respective surface, which is generally preferred (even independently of the combination of brushing and grinding).

In a preferred embodiment, the application of the coating in step i) occurs in a galvanic manner, that is, as an electrochemical deposition. In this case, the component or the surface to be coated is placed in a bath and a current is applied to it as an electrode, such as, for example as a cathode for the accumulation of positive metal ions. By way of the rounding, it is thereby possible to prevent a concentration of electrical field lines and thus any excess material deposition; see also the above comments. In general, however, the coating can also take place by a chemical coating that does not involve an external current or by soldering.

In a preferred embodiment, the coating comprises a metal matrix, preferably one made up of nickel with incorporated particles of boron nitride as hard material; this can involve, in particular, a so-called Ni/cBN coating. The boron nitride, on the one hand, may be of interest on account of its high strength, in particular for the preparation of blade tips for running-in. On the other hand, the brittle material may as such be prone to cracking or cBN crystals may be present in the coating and, on account of their edged structure, may represent sites for initiation of crack propagation. Through the reduction or prevention of the overhang of the coating by way of the rounding, it is possible to diminish at least the risk of initiation of cracks. Instead of the particles of cBN hard material, it is also possible to use similarly hard particles, such as, for example, diamond particles or carbides.

As already mentioned, the component preferably involves a blade body for a turbomachine that is therefore arranged in the gas channel thereof. Preferably, the blade body is part of a rotating blade and the radially outer-lying blade tip surface thereof is the "first" surface. The then rounded edge accordingly lies between the blade tip surface and a suction side surface or pressure side surface; preferably, both edges are rounded. In general, a use for compressor guide vanes as well as in the turbine region is also conceivable; what is preferably involved is a compressor blade.

The invention also relates to a method for the production of such a component, in particular of a blade body, preferably of a rotating blade/compressor blade, and, namely, by coating in accordance with the present disclosure.

The invention further relates to a component for a turbomachine that has been produced in a corresponding method, in particular a blade body of a rotating blade/compressor blade. The coating applied to the first surface is here at most flush with the second surface as viewed in section, that is, it does not overhang outward (it can be slightly displaced inward).

BRIEF DESCRIPTION OF THE DRAWINGS

The invention is described in detail below on the basis of exemplary embodiments, whereby the individual features in the scope of the dependent claims can also be a key part of the invention in another combination and, here, too, no distinction is made in detail between the different claim categories.

Shown in detail are.

DESCRIPTION OF THE INVENTION

Figure 1:
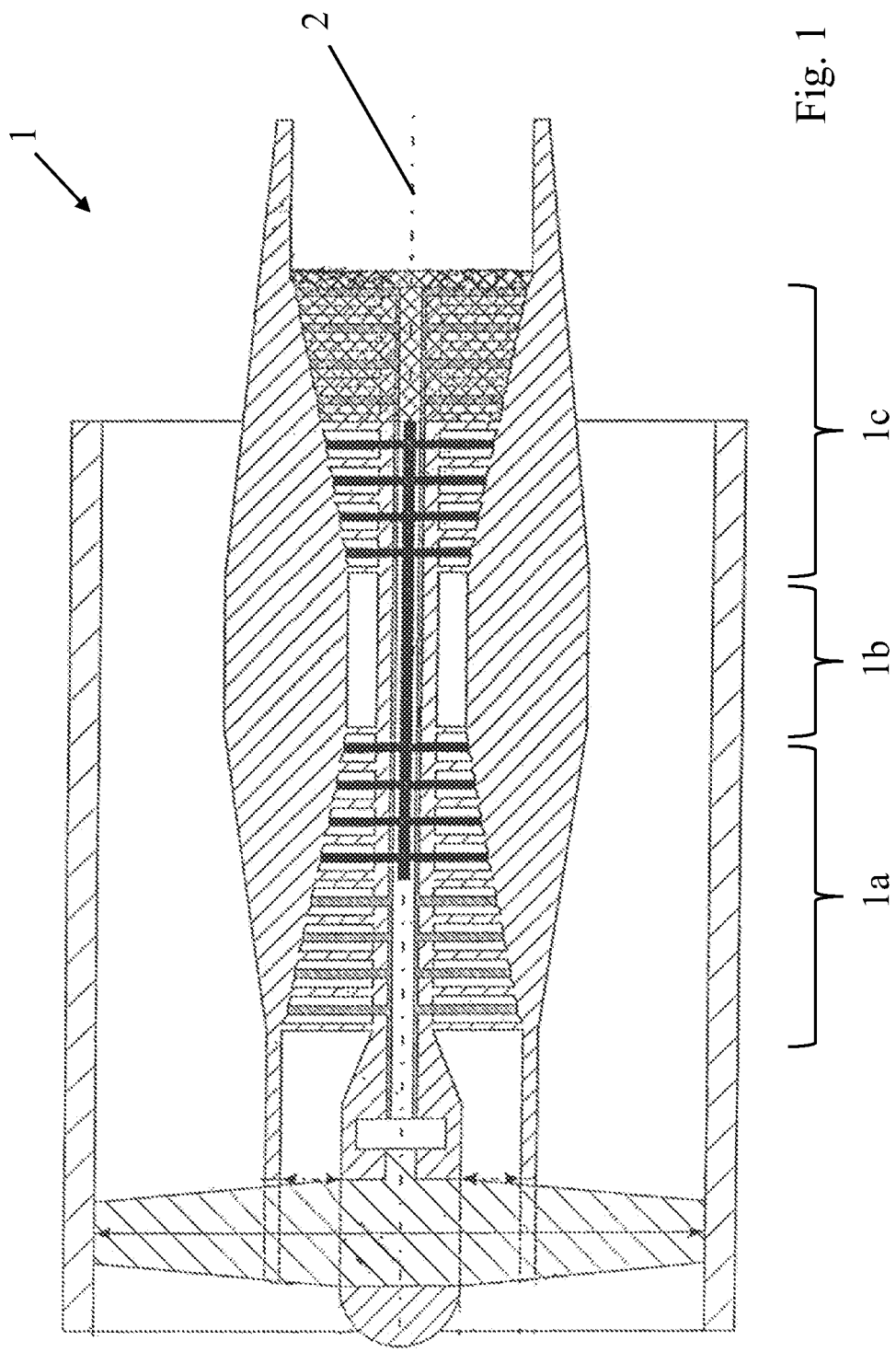
FIG. 1: a turbomachine, namely, a turbofan engine in a schematic longitudinal section.

FIG. 1 shows a turbomachine 1, specifically a turbofan engine, in an axial section. The turbomachine 1 is functionally divided into a compressor 1a, a combustion chamber 1b, and a turbine 1c. Both the compressor 1a and the turbine 1c are each constructed of a plurality of stages, with each stage composed of a guide vane ring and a following rotating vane ring. In the compressor 1a, the inflow air is compressed and then undergoes combustion with admixed kerosene in the downstream combustion chamber 1b. The present subject is directed, in particular, at a rotating blade, which, in general, can also find application in the turbine 1c, but, in particular, in the compressor 1a.

Figure 2:
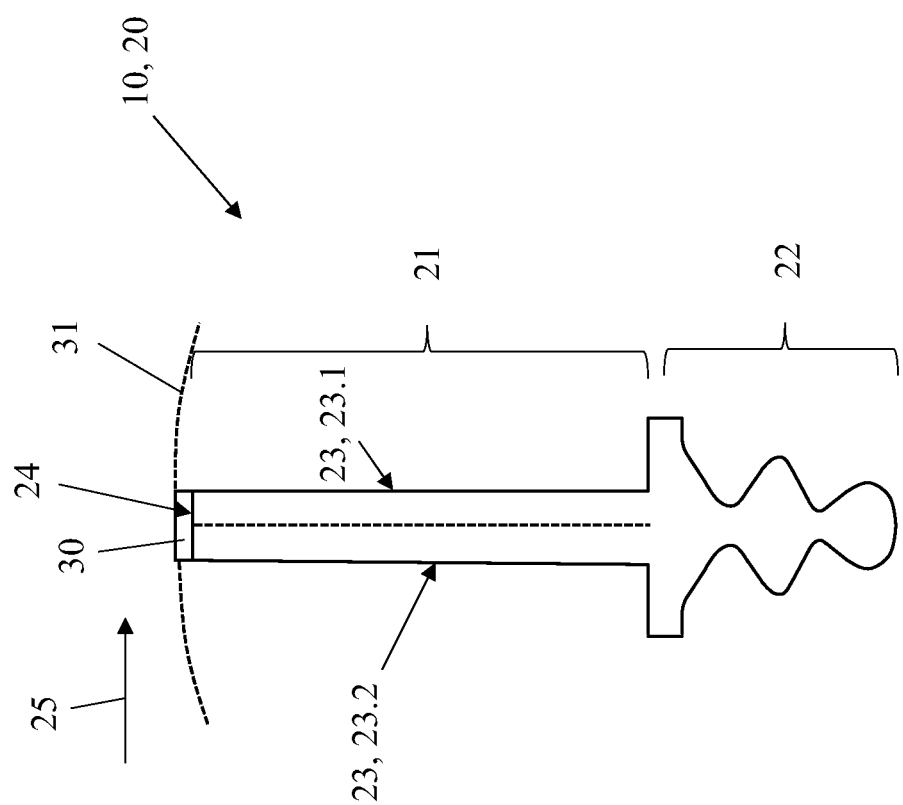
FIG. 2: a rotating blade in a schematic overview depiction.

FIG. 2 shows a component 10, namely, a rotating blade body 21 of a rotating blade 20, which, in addition, has a blade root 22, in a schematic axial view. The rotating blade 20 is mounted with the blade root 22 in a disk, which is not depicted here, and, in operation, rotates in a direction of rotation 25. The blade body has two side surfaces 23, namely, a suction side surface 23.1 and a pressure side surface 23.2. A coating 30 is applied to a blade tip surface 24 and serves for running-in in a run-in lining 31, which is indicated here only schematically.

Figure 3:
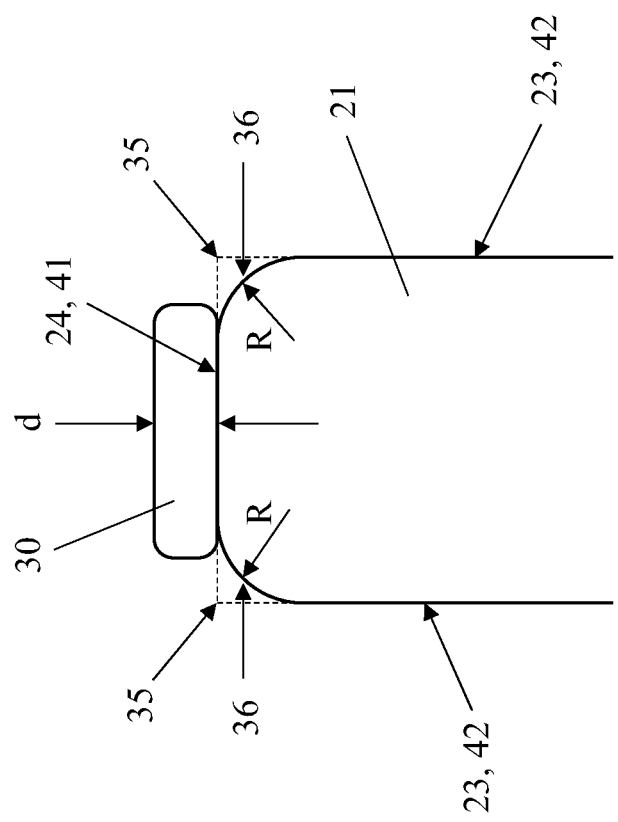
FIG. 3: a detail view for illustration of a coating applied to the blade tip of the rotating blade in accordance with FIG. 2.

FIG. 3 shows the blade tip surface 24 with the coating 30 in a detail view. The coating 30 is applied by electrochemical deposition of a metal matrix, preferably nickel with the incorporation of particles of hard material, preferably boron nitride. The blade tip surface 24 presents a first surface 41, which is coated, whereas the side surfaces 23 are second surfaces 42 and remain uncoated. Prior to the application of the coating, the blade tip surface 24 is ground, as a result of which a sharp edge 35 with respect to the second surfaces 42 is created in each instance. This edge is rounded prior to the application of the coating 30, which, in the present case, takes place through a combination of brushing and subsequent grinding. In this way, during the subsequent galvanic deposition, a concentration of electric field lines is prevented, so that no excess application of material is found there, nor does the coating 30 overhang laterally. The respective rounding 36 is adjusted in such a way that the respective radius of curvature R corresponds approximately to the thickness d of the coating 30.

Figure 4:
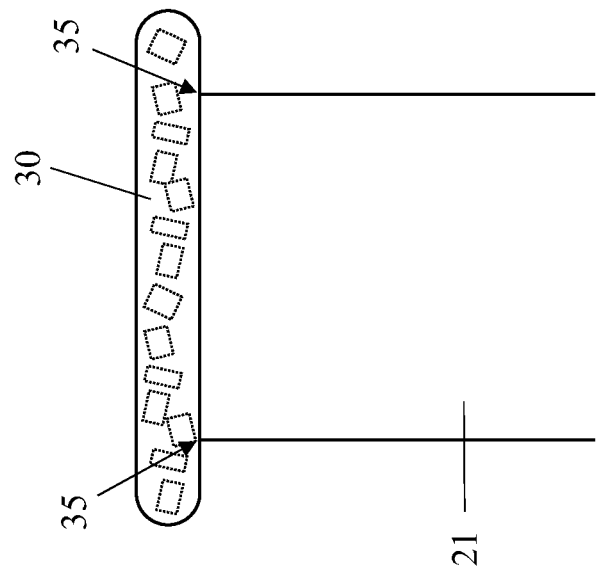
FIG. 4 a comparative depiction of a coating that is not in accordance with the invention.

FIG. 4 shows, for comparison, a blade tip surface 24 that is not coated in accordance with the invention. The coating 30 overhangs laterally opposite side surfaces 23, which can be detrimental in terms of structural mechanics. Thus, for example, under high-frequency alternating load, in particular under a vibrational load in the blade tip region 24, cracks form in the coating 30 and propagate from there into the blade body 21. This crack initiation can be promoted by crystalline boron nitride, which is indicated here schematically.

Figure 5:
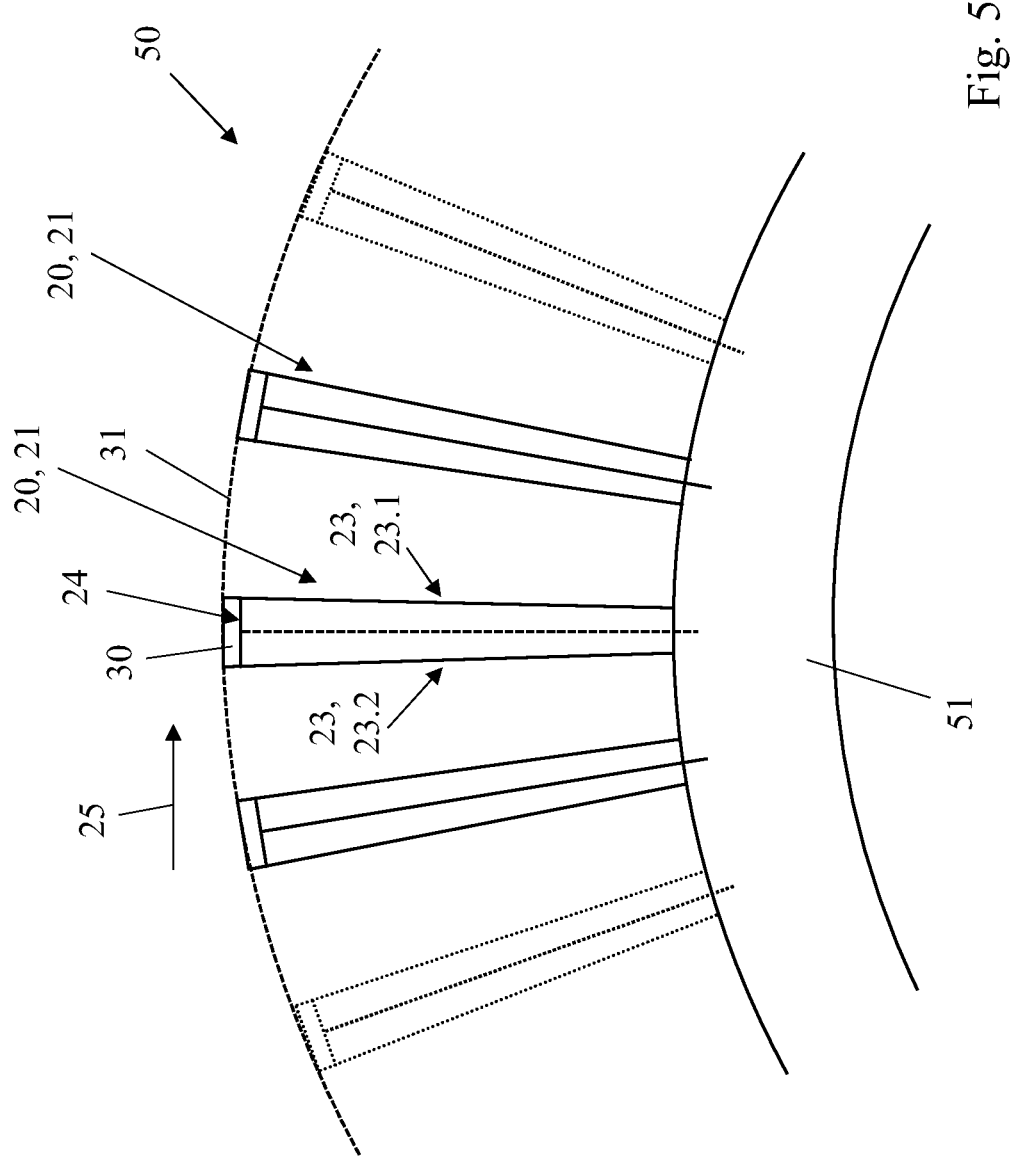
FIG. 5 a rotating blade as part of a blisk.

FIG. 5 shows a design of the rotating blade 20 that is an alternative to FIG. 2, namely, as part of a so-called blisk 50 (blade-integrated disk). In this case, the blade bodies 21 of the rotating blades 20 are provided on the disk 51 in an integral manner. What is involved here, therefore, is an integral part (of which only an excerpt is shown in FIG. 5). The blade tip surfaces 24 of the blade bodies 21 are thereby each furnished with a coating 30; see the above detailed description.

What is claimed is:

1. A method for coating a blade body for a turbomachine, wherein the blade body has a first and a second surface and wherein the first and the second surface adjoin each other at an edge, the method comprising the steps of:
   i) first, rounding an entire length of the edge between the first and second surfaces, and
   ii) subsequently, applying a coating to the first surface, wherein the rounding of the edge in step i) comprises a processing with a brush prior to application of the coating to the first surface.

2. The method according to claim 1, wherein a rounding introduced in step i) between the first and second surfaces has, as viewed in section, a radius of curvature R that corresponds to at least 0.5 times a thickness d of the coating, that is, $R \geq 0.5 \cdot d$.

3. The method according to claim 1, wherein a rounding introduced in step i) between the first and second surfaces has, as viewed in a section, a radius of curvature R that corresponds to at most 5 times a thickness d of the coating, that is, $R \leq 5 \cdot d$.

4. The method according to claim 1, wherein the first surface is processed in a material-removing manner prior to step i) and the edge is thereby produced.

5. The method according to claim 1, wherein, in step i), after the processing with the brush and prior to application of the coating to the first surface, a grinding processing occurs.

6. The method according to claim 1, wherein the coating is applied in a galvanic manner in step ii).

7. The method according to claim 1, wherein the coating contains boron nitride.

8. The method according to claim 1, wherein the first surface is a blade tip surface and the second surface is a side surface of the blade body.

9. A method for producing a blade body for a turbomachine, wherein the blade body is coated in a method in accordance with claim 1.

\* \* \* \* \*